(12) United States Patent
Yoshino et al.

(10) Patent No.: US 7,748,884 B2
(45) Date of Patent: Jul. 6, 2010

(54) DISPLAY ILLUMINATION DEVICE WITH LIGHT SENSOR

(75) Inventors: Koji Yoshino, Kanagawa (JP); Susumu Kimura, Tokyo (JP); Hiromasa Suzuki, Kanagawa (JP)

(73) Assignee: Sony Corporation, Tokyo (JP)

( * ) Notice: Subject to any disclaimer, the term of this patent is extended or adjusted under 35 U.S.C. 154(b) by 467 days.

(21) Appl. No.: 11/682,047

(22) Filed: Mar. 5, 2007

(65) Prior Publication Data

US 2009/0046455 A1 Feb. 19, 2009

(30) Foreign Application Priority Data

Mar. 6, 2006 (JP) .......................... P2006-059995

(51) Int. Cl.
*F21V 7/00* (2006.01)
*F21V 9/08* (2006.01)

(52) U.S. Cl. ................. 362/631; 362/613; 362/231

(58) Field of Classification Search ............ 362/612, 362/613, 631, 97.2, 97.3, 231; 349/61–71; 315/151

See application file for complete search history.

(56) References Cited

U.S. PATENT DOCUMENTS

| 5,381,309 | A | * | 1/1995 | Borchardt | 362/612 |
| 5,404,277 | A | * | 4/1995 | Lindblad | 362/631 |
| 6,417,897 | B1 | * | 7/2002 | Hashimoto | 349/65 |
| 6,871,975 | B2 | * | 3/2005 | Chuang | 362/27 |
| 7,202,920 | B2 | * | 4/2007 | Aoyagi et al. | 349/62 |
| 7,270,464 | B2 | * | 9/2007 | Nakayoshi et al. | 362/613 |
| 7,359,012 | B2 | * | 4/2008 | Ishiwa et al. | 349/65 |
| 7,458,709 | B2 | * | 12/2008 | Lang et al. | 362/612 |
| 2002/0130985 | A1 | * | 9/2002 | Weindorf et al. | 349/61 |
| 2005/0058450 | A1 | | 3/2005 | Yamamoto et al. | |
| 2005/0254260 | A1 | * | 11/2005 | Li | 362/633 |
| 2006/0114694 | A1 | * | 6/2006 | Cho et al. | 362/631 |
| 2006/0256579 | A1 | * | 11/2006 | Yang et al. | 362/613 |

FOREIGN PATENT DOCUMENTS

| JP | 2005-071702 | | 3/2005 |
| JP | 2005-091526 | | 4/2005 |
| JP | 2005-91526 | * | 4/2005 |

* cited by examiner

*Primary Examiner*—Ismael Negron
(74) *Attorney, Agent, or Firm*—Sonnenschein Nath & Rosenthal LLP

(57) ABSTRACT

An optical display device, including a light guiding plate, a light detecting sensor and at least two illuminants. The light detecting sensor and the illuminants are commonly mounted on a wiring board with the at least two or more illuminants disposed to face a light incidence surface of the light guiding plate. The light detecting sensor is disposed on the same side of the wiring board as the illuminants with respect to the light guiding plate.

9 Claims, 9 Drawing Sheets

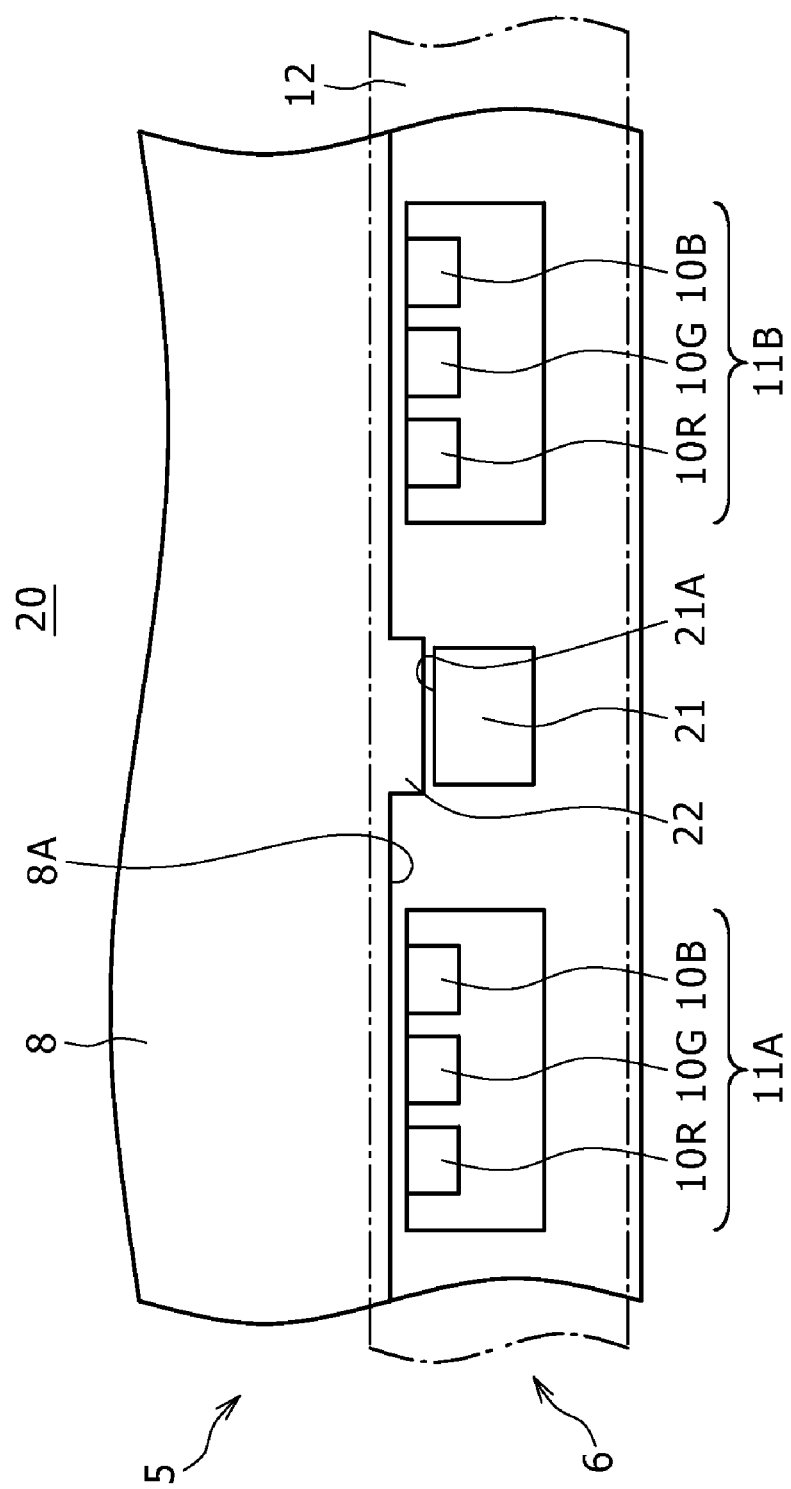

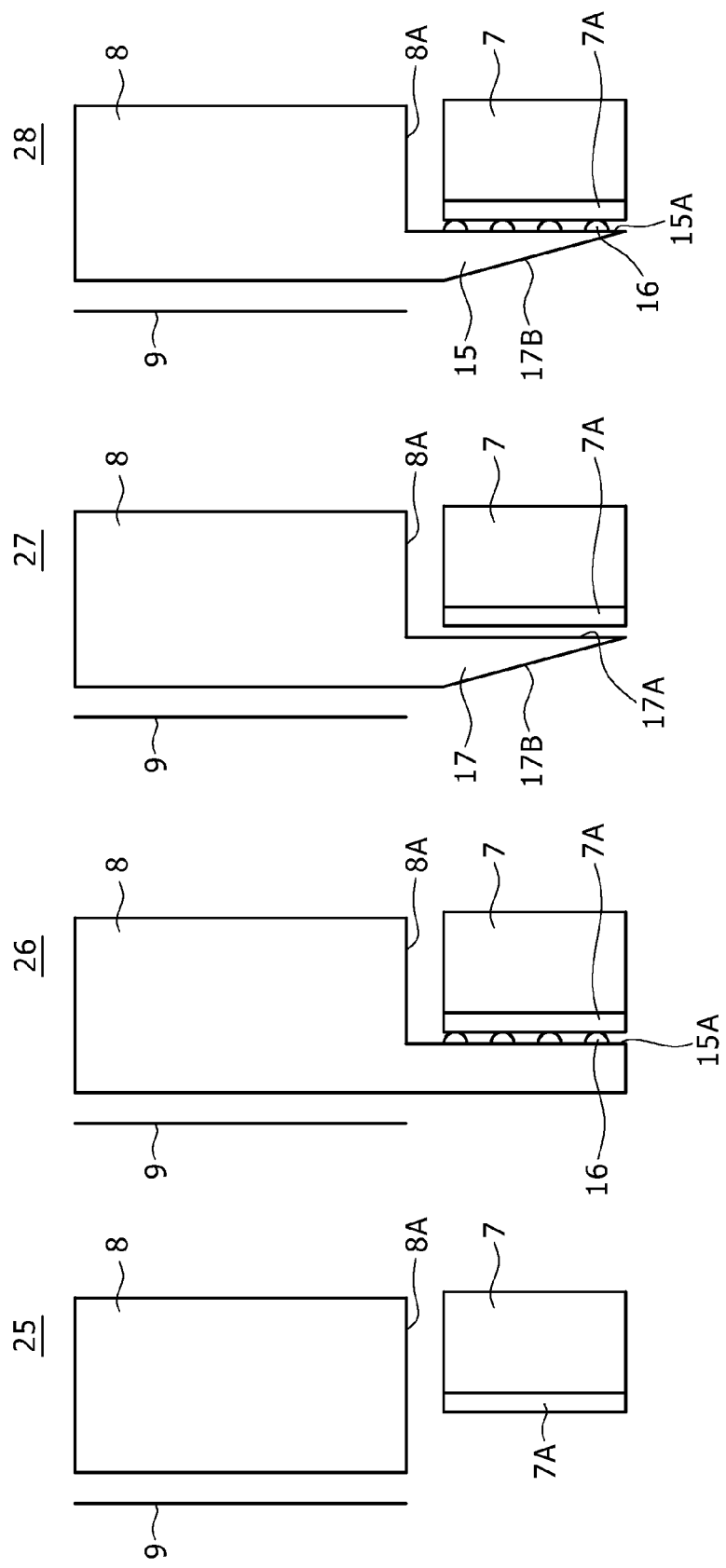

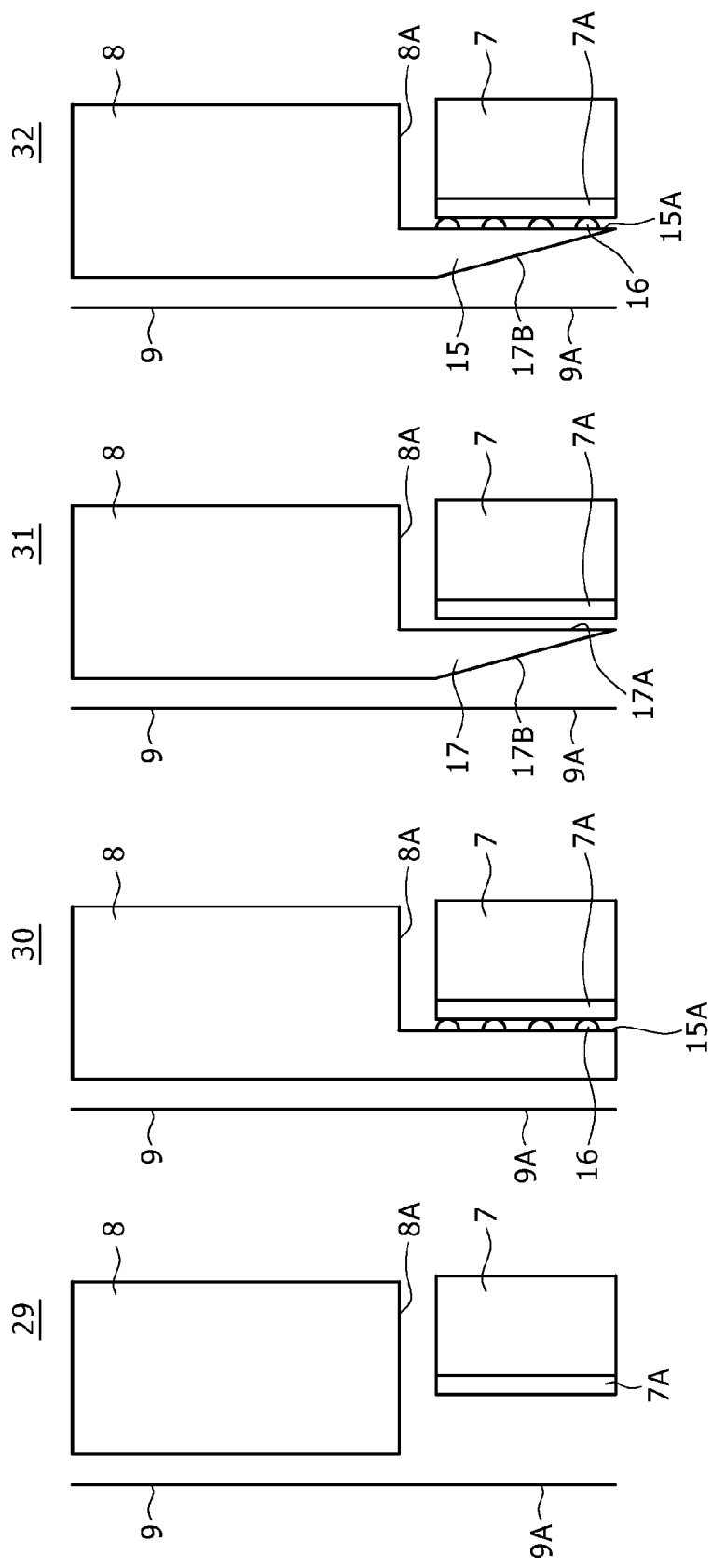

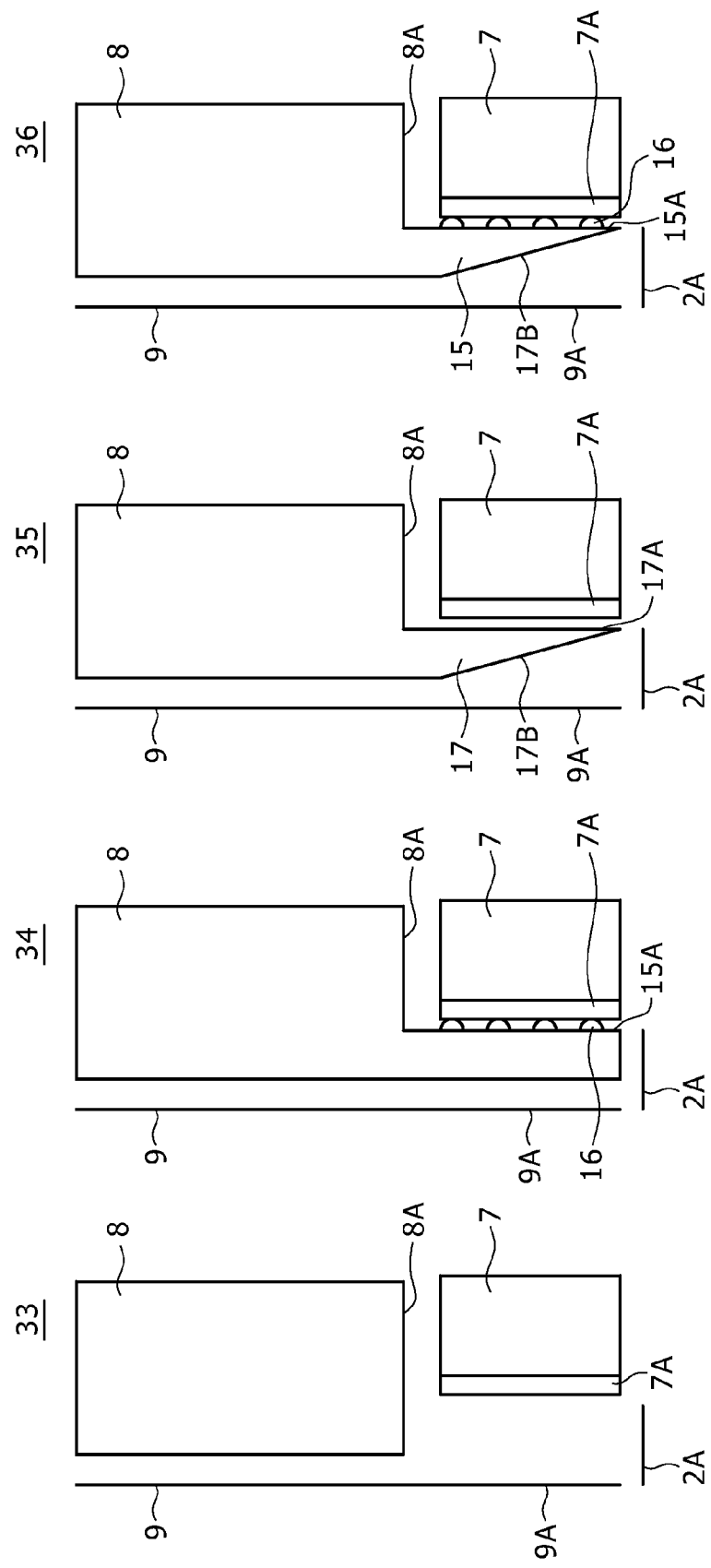

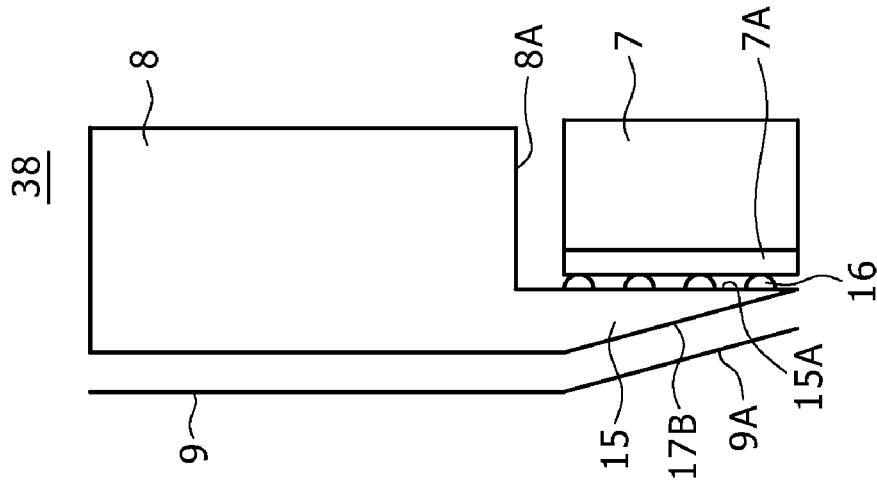
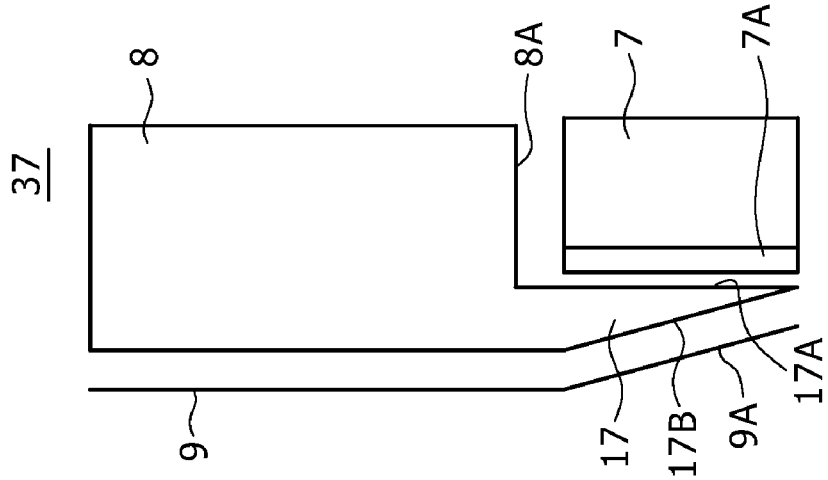

DISPLAY ILLUMINATION DEVICE WITH LIGHT SENSOR

CROSS REFERENCE TO RELATED APPLICATIONS

The present invention contains subject matter related to Japanese Patent Application JP 2006-059995 filed in the Japanese Patent Office on Mar. 6, 2006, the entire contents of which being incorporated herein by reference.

BACKGROUND OF THE INVENTION

1. Field of the Invention

The present invention relates to a transmission type liquid crystal display device and various types of optical display devices for guiding color display lights emitted from a light emitting portion having at least two or more illuminants having different peak wavelengths, for example, a red illuminant, a green illuminant, and a blue illuminant to a display portion through a light guiding plate provided on a back face side of the display portion in order to perform color display.

2. Description of the Related Art

For example, in a transmission type or semi-transmission type liquid crystal display device, a back face of a display panel unit having a liquid crystal panel is combined with a display light guiding optical unit having a light guiding plate, a light diffusion plate, a reflecting plate (reflecting sheet), or the like. Color display lights are made incident from a light emitting portion having a red illuminant, a green illuminant, and a blue illuminant to the display light guiding optical unit. A light emitting diode (LED), for example, having high luminance characteristics, low power consumption characteristics, long life characteristics, or the like has been used as a light emitting source in the liquid crystal display device. In the liquid crystal display device, a red display light, a green display light, and a blue display light which are emitted from a red LED, a green LED, and a blue LED, respectively, are mixed with one another within a light guiding plate to turn into a white display light. The resulting white display light is guided from the light guiding plate to a display panel unit. The liquid crystal display device controls transmission and light shielding of the white display light in the display panel unit, so that predetermined color display is performed.

Now, in the liquid crystal display device using the LEDs or light sources, the light emission states of the red LED, the green LED, and the blue LED are changed due to a change in an ambient temperature, a dispersion of products, a large term change, and the like. As a result, there is caused a problem such that a white balance among the display lights is lost, and thus a dispersion occurs in a luminance and a color tone. Therefore, in order to cope with this problem, the liquid crystal display device is provided with a light detecting sensor for detecting the states of the display lights. Also, the light emission states of the red LED, the green LED, and the blue LED are controlled in accordance with a detection signal outputted from the light detecting sensor. This technique, for example, is disclosed in Japanese Patent Laid-open Nos. 2005-71702 and 2005-91526.

That is to say, in a liquid crystal display device 100 of a related art, as shown in FIGS. 12 and 13, a display panel unit 102 having a liquid crystal panel (the details of which are omitted here) is assembled in a frame 101. Also, a backlight unit 103 is assembled in the frame 101 so as to be located on a back face side of a display panel unit 102. The backlight unit 103 includes a display light guiding optical unit 104, a light emitting portion 105 for emitting display lights, a detection portion 106 for detecting states of the display lights, and the like. In the backlight unit 103, the display light guiding optical unit 104 has a light guiding plate 107, a reflecting plate (reflecting sheet) 108, or a diffusion sheet (not shown), and the like. Here, the light guiding plate 107 is combined with a back face of the display panel unit 102 so as to face the back face of the display panel unit 102. Also, the reflecting plate 108 is combined with a back face of the light guiding plate 107 so as to face the back face of the light guiding plate 107.

In the backlight unit 103, the light emitting portion 105 includes a plurality of light emitting units 110 having a red LED 109R, a green LED 109G, and a blue LED 109B (hereinafter generally referred to as "LEDs 109" except for individual description thereof). In the light emitting portion 105, the light emitting units 110 are installed in an LED flexible wiring board 111 which is attached to the frame 101 so as to be located in a lower portion of the display panel unit 102. Also, in the light emitting portion 105, the light emitting units 110 are installed on the LED flexible wiring board 111 so that light emission surfaces of the LEDs 109, as shown in FIG. 13, face a lower end face 107A of the light guiding plate 107.

In the backlight unit 103, driving voltages are supplied from an LED driving circuit portion 112 to the LEDs 109, respectively, through the LED flexible wiring board 111, so that the LEDs 109 are turned on to emit a red display light, a green display light, and a blue display light, respectively. In the backlight unit 103, the display lights emitted from the LEDs 109, respectively, are made incident from the lower end face 107A of the light guiding plate 107 to the inside of the light guiding plate 107. Also, the display lights are mixed with one another in the inside of the light guiding plate 107 to turn into a white display light and the resulting white display light is supplied to the display panel unit 102.

In the backlight unit 103, the detection portion 106 detects the states of the display lights, and as shown in FIG. 12, outputs a detection signal to a controller 113. The detection portion 106 is disposed in the frame 101 so as to be located in an upper portion of the display panel unit 102 and so as to face the above-mentioned light emitting portion 105. Also, the detection portion 106 includes a red sensor 114R, a green sensor 114G, and a blue sensor 114B (hereinafter generally referred to as "color sensors 114" except for individual description thereof). The color sensors 114 of the detection portion 106 are mounted on a sensor flexible wiring board 115 so that their light receiving portions face an upper end face 107B of the light guiding plate 107.

In the liquid crystal display device 100 constructed as described above, a part of the white display light which is guided to the inside of the light guiding plate 107 leaks from the upper end face 107B. The leakage white display light is detected by the detection portion 106. In the liquid crystal display device 100, for example, the controller 113 determines a red component, a green component, and a blue component, of the white display light, which are detected by the respective color sensors 114 of the detection portion 106. Then, the controller 113 outputs a control signal to the LED driving circuit portion 112. As a result, in the liquid crystal display device 100, the turn-on states of the LEDs 109 are controlled, and the luminance and the color tone are controlled so that the white display light in which the balance among the red component, the green component, and the blue component is optimized is supplied to the display panel unit 102.

SUMMARY OF THE INVENTION

Now, when the liquid crystal display device 100, for example, is installed in a mobile apparatus, miniaturization, thin make, and weight-lightening are necessary for the liquid crystal display device 100. The liquid crystal display device disclosed in Japanese Patent Laid-open No. 2005-71702 adopts a construction in which an optimal sensor is disposed at a central portion on a back face side of a light guiding plate so as to face a diffusion plate. As a result, an entire thickness increases due to provision of a wiring board having the optical sensor mounted therein, and the like as well as the optical sensor having a predetermined thickness. In addition, such a liquid crystal display device has a construction in which two wiring boards are installed in an upper portion and a lower portion, respectively, between which a light guiding plate is held, and a large number of LEDs are disposed in one of the two wiring boards. Thus, it becomes difficult to realize the miniaturization and the thin make and also it becomes troublesome to cope with the assembly and the maintenance all the more because of the independent provision of the wiring board for the LEDs and the wiring board for the optical sensor. From the construction described above, the liquid crystal display device must adopt a so-called top view type light detecting sensor in which a light receiving portion is provided on a principal surface.

In addition, the liquid crystal display device disclosed in Japanese Patent Laid-open No. 2005-91526 is one identical to the above-mentioned liquid crystal display device 100 of the related art. Thus, an optical sensor of a detection portion is disposed in a peripheral portion of a light guiding plate so as to face LEDs of a light emitting portion, which makes it possible to perform the thin make as compared with the liquid crystal display device 100 disclosed in Japanese Patent Laid-open No. 2005-71702. In such a liquid crystal device, the red display light, the green display light, and the blue display light which are emitted from the light emitting portion are mixed with one another in the inside of the light guiding plate to turn into the white display light. Also, the optical sensor receives the resulting white display light to detect the individual color components of the white display light. However, the liquid crystal display device has the construction in which the LEDs and the optical sensor are disposed so as to face each other. Thus, the optical sensor directly receives a part of the lights emitted from the respective LEDs, which results in a detection precision being reduced. In the liquid crystal display device, similarly to the liquid crystal display device disclosed in Japanese Patent Laid-open No. 2005-71702, a wiring board for the LEDs and the wiring board for the optical sensor are provided independently of each other. As a result, there is caused a problem such that it becomes difficult to realize the miniaturization and the thin make, and also it is troublesome to cope with the assembly and the maintenance.

Furthermore, from the construction described above, the liquid crystal display device must adopt a so-called side view type light detecting sensor in which a light receiving portion is provided as an optical sensor in a side face. On the other hand, when adopting the top view type light detecting sensor described above, the liquid crystal display device involves a problem such that a thickness increases due to a shape of the light detecting sensor, and thus the light detecting sensor has a less degree of freedom.

In the light of the foregoing, it is desirable to provide an optical display device in which miniaturization, thin make, assembleness, and maintenance are improved, and luminance and a color tine are optically controlled.

According to an embodiment of the present invention, an optical display device includes a light emitting portion, a light guiding plate, and a light detecting sensor. The light emitting portion has at least two or more illuminants having different peak wavelengths. The light guiding plate makes emission lights emitted from the at least two or more illuminants, respectively, incident to its inside with its peripheral portion facing the light emitting portion as a light incidence portion, mixes the emission lights with one another, and guides the resulting light as a white display light to a display portion. The light detecting sensor is disposed in the peripheral portion of the light guiding plate for detecting the white display light in order to control light emission states of the at least two or more illuminants. The light detecting sensor is mounted on a wiring board having the at least two or more illuminants mounted thereon so as to be disposed to face the light incidence portion of the light guiding plate, so that the light detecting sensor is disposed on the same side as that of the at least two or more illuminants with respect to the light guiding plate.

In the optical display device according to the embodiment of the present invention, when the at least two or more illuminants disposed in the peripheral portion of the light guiding plate are turned on, the display lights emitted from the respective illuminants are made incident from the light incidence portion to the light guiding plate, and are mixed with one another in a process of being guided to the inside of the light guiding plate to turn into the white display light. The white display light leaks through a principal surface of the light guiding plate to be made to the display panel. In the optical display device, a part of the white display light which is guided to the inside of the light guiding plate and reflected by a surface facing the light incidence portion leaks through a peripheral portion of the light guiding plate to be received by the light detecting sensor. Also, the light detecting sensor detects components of the white display light. In the optical display device, the light emission states of the at least two or more illuminants are controlled in accordance with a detection signal sent from the light detecting sensor, so that the display is performed at the optimal luminance and color tone.

In the optical display device, the reciprocating of the display lights within the light guiding plate increases the propagation optical path thereof. As a result, the display lights emitted from the respective illuminants are sufficiently mixed with one another to turn into the white display light. The light detecting sensor receives the resulting white display light, which results in the components of the white display light being detected with high precision. In the optical display device, the light detecting sensor is mounted on the same wiring board as that having the illuminants mounted thereon. Therefore, the wiring structure is simplified due to the common wiring, so that the assembly and the maintenance are improved. In addition thereto, the miniaturization, the thin make, and the cost reduction are realized. In the optical display device, the light detecting sensor may also be mounted is a space defined between the illuminants on the wiring board. In this case, the miniaturization and the thin make are realized due to the improvement in a space efficiency. In the optical display device, a light guiding protrusion portion having a suitable shape may be formed integrally with the peripheral portion of the light guiding plate in order to guide the white display light to the light receiving portion of the light detecting sensor. In this case, the suitable light detecting sensor which is not limited to the light reception specification is used, and the light receiving efficiency is also improved.

In the optical display device, for example, when the top view type light detecting sensor is used, the light guiding protrusion portion which protrudes from the peripheral portion of the light guiding plate to face the light receiving portion is formed integrally with the peripheral portion of the light guiding plate. Also, the light detecting sensor receives the white display light which leaks through the principal surface of the light guiding protrusion portion. In the optical display device, there is adopted a constriction such that an extension portion of a reflecting sheet which extends along the light guiding protrusion portion is made to face a light receiving portion of the light detecting sensor, a construction such that a total reflection surface is formed in the light guiding protrusion portion, or a construction such that a surface facing the light receiving portion is made a roughened surface. In this case, the light receiving efficiency in the light detecting sensor is enhanced, and the white display light is detected with high precision.

According to the optical display apparatus of the embodiment of the present invention, the light detecting sensor and the illuminants are mounted on the same wiring board so as to face the peripheral portion of the light guiding plate. As a result, the components are detected about the white display light which is obtained by sufficiently mixing the display lights emitted from the respective illuminants with one another in the light guiding plate. Also, the operation is controlled with high precision, so that the display is made at the optical luminance and color tone. In addition, according to the optical display apparatus of the embodiment of the present invention, the miniaturization and the thin make can be realized due to the improvement in the space efficiency and the simplification for the wiring. Also, the assembly and the maintenance are improved, and the cost reduction is realized.

BRIEF DESCRIPTION OF THE DRAWINGS

FIG. 7 is a front view showing a construction of a main portion of another light emitting portion of a liquid crystal display device according to a second embodiment of the present invention, with parts being partially broken away;

FIGS. 8A to 8D are respectively views showing simulation results about a light guiding construction in the case where there is no reflecting sheet;

FIGS. 9A to 9D are respectively views showing simulation results about a light guiding construction in the case where there is a reflecting sheet;

FIGS. 10A to 10D are respectively views showing simulation results about a light guiding construction in the case where there are a reflecting sheet and a frame light shielding portion;

FIGS. 11A to 11D are respectively views showing simulation results about a light guiding construction in the case where there is a reflecting sheet;

DETAILED DESCRIPTION OF THE PREFERRED EMBODIMENTS

Figure 1:
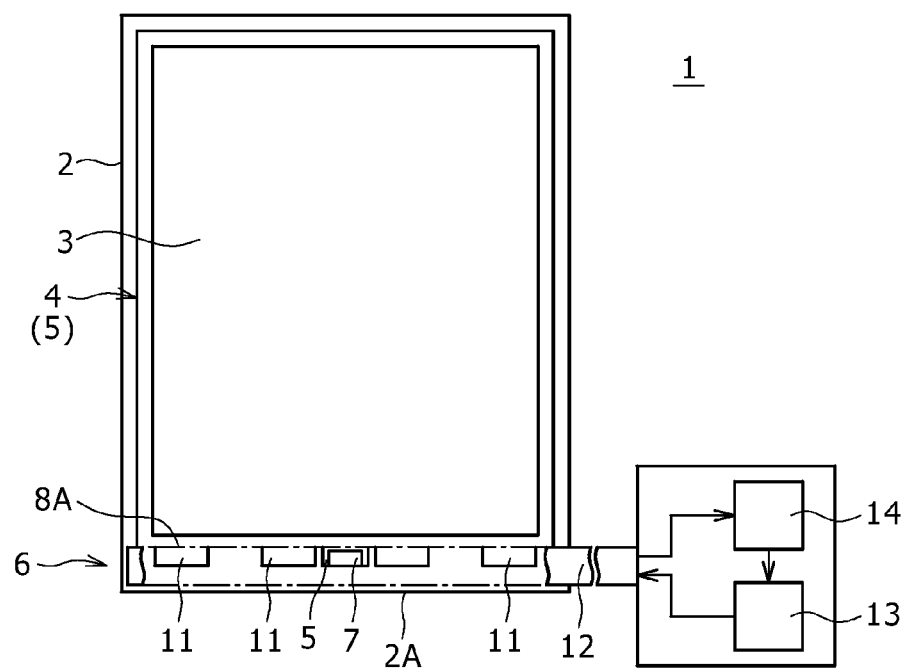
FIG. 1 is a front view of a main portion of a liquid crystal display device according to a first embodiment of the present invention.
Figure 2:
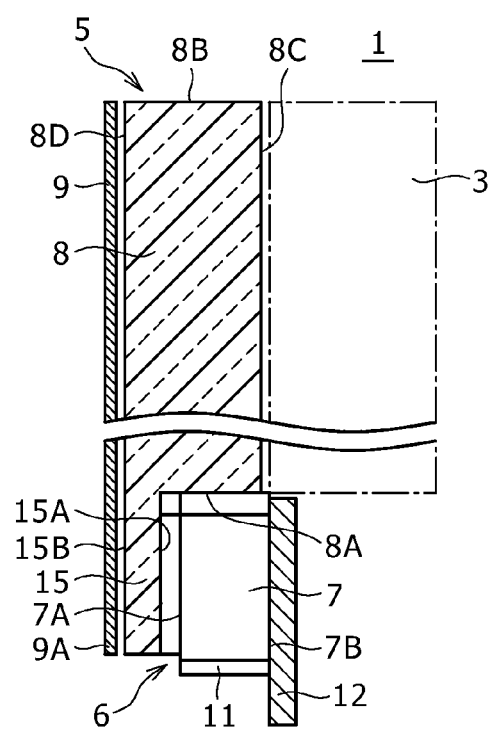
FIG. 2 is a cross sectional view of the main portion of the liquid crystal display device according to the first embodiment of the present invention.

A liquid crystal display device according to a first embodiment of the present invention will be described in detail hereinafter with reference with the accompanying drawings. A liquid crystal display device 1 is similar in basic construction to the above-mentioned liquid crystal display device 100 of the related art. That is to say, as shown in FIGS. 1 and 2, a display panel unit 3 and a backlight unit 4 are assembled in a frame 2 one on top the other. While a description of details is omitted here, the display panel unit 3, for example, has a display panel. The display panel is constructed by laminating a deflecting filter, glass substrates, transparent electrodes, an orientation film, a liquid crystal, a color filter, a deflecting plate, and the like. The display panel unit 3 is assembled in the frame 2 with its peripheral portion being fixed.

In the liquid crystal display device 1, the backlight unit 4 has a display light guiding optical unit 5, a light emitting portion 6 for emitting display lights, and the like. Also, the backlight unit 4 has a light detecting sensor 7 for detecting states of the display lights, and outputting a detection signal in accordance with which the light emitting portion 6 is controlled. Here, details of the light detecting sensor 7 will be described later. The display light guiding optical unit 5 of the backlight unit 4 has a light guiding plate 8, a reflecting sheet 9, or a diffusion sheet (not shown), and the like. Here, the light guiding plate 8 is combined with a back face of the display panel unit 3 so as to face the back face of the display panel unit 3. Also, the reflecting sheet 9 is combined with a back face of the light guiding plate 8 so as to face the back face of the light guiding plate 8.

The light emitting portion 6 of the backlight unit 4 includes a plurality of light emitting units 11 having a red LED 10R, a green LED 10G, and a blue LED 10B (hereinafter generally referred to as "LEDs 10" except for individual descriptions thereof). The plurality of light emitting units 11 of the light emitting portion 6 are mounted on a flexible wiring board 12. The flexible wiring board 12 is attached to the frame 2 so as to be located in a lower portion of the display panel 3.

The feature of the backlight unit 4 is the construction that the light detecting sensor 7, as its details will be described layer, mounted together with the plurality of light emitting units 11 is mounted on the flexible wiring board 12. The plurality of light emitting units 11 of the backlight unit 4 are mounted on the flexible wiring board 12 so that as shown in FIG. 2, light emission surfaces of the LEDs 10 face a lower end face constituting a light incidence surface 8A of the light guiding plate 8. In the backlight unit 4, the light detecting sensor 7 is mounted on the flexible wiring board 12, which results in that the light detecting sensor 7 and the plurality of light emitting units 11 are disposed so as to face the light incidence surface 8A of the light guiding plate 8.

In the backlight unit 4, an LED driving circuit portion 13 supplies driving voltages to the respective LEDs 10 through the flexible wiring board 12, so that the LEDs 10 are turned on to emit therefrom a red display light, a green display light, and a blue display light, respectively. In the backlight unit 4, the display lights emitted from the respective LEDs 10 are made incident from the light incidence surface 8A of the light guiding plate 8 to the inside of the light guiding plate 8, and are mixed with one another in the inside of the light guiding plate 8 to turn into the white display light. The resulting white display light is supplied to the display panel unit 3. Also, in the backlight unit 4, a part of the white display light guided to the inside of the light guiding plate 8 is reflected by an upper end face 8B facing the light incidence surface 8A to be guided to the light incidence surface 8A side.

In the backlight unit 4, the light detecting sensor 7 receives a feedback white display light to detect the color components of the feedback white display light thus received. The controller 14 determines the white display light, the red display light, the green display light, and the blue display light detected by the light detecting sensor 7 in the backlight unit 4, and outputs a control signal to an LED driving circuit portion 13. In the backlight unit 4, the turn-on states of the LEDs 10 are controlled in the manner described above, and the luminance and the color tone are controlled so that the white display light in which the balance among the red component, the green component, and the blue component is optimized is supplied to the display panel unit 3.

The backlight unit 4 is joined in a state of nearly tightly contacting the back face side of the display panel unit 3, and the peripheral portion thereof is assembled in the frame 2, so that the display light guiding unit 5 supplies the white display light to the display panel unit 3. The light guiding plate 8 of the display light guiding optical unit 5 is made of a synthetic resin material having a light transmission property and a light diffusion property, for example, a polycarbonate resin, an acrylate resin, or the like. The light guiding plate 8 supplies the white display light from a first principal surface 8C facing the display panel unit 3 to the display panel unit 3. Also, as shown in FIG. 2, the joining of the reflecting sheet 9 to a second principal 8D side of the light guiding plate 8 prevents the white display light from leaking.

The light emitting portion 6 includes a plurality of light emitting units 11. In this case, as shown in FIG. 1, the plurality of light emitting units 11 are mounted side by side on the flexible wiring board 12 which is provided in the frame 2 so as to face the light incidence surface 8A of the light guiding plate 8. Each of the plurality of light emitting units 11 of the light emitting portion 6 includes the red LED 10R, the green LED 10G, and blue LED 10B in the manner described above. However, the color LEDs 10 do not need to have the same number of LEDs, and thus may be mounted on the flexible wiring board 12 with a combination of predetermined numbers of LEDs.

Figure 3:
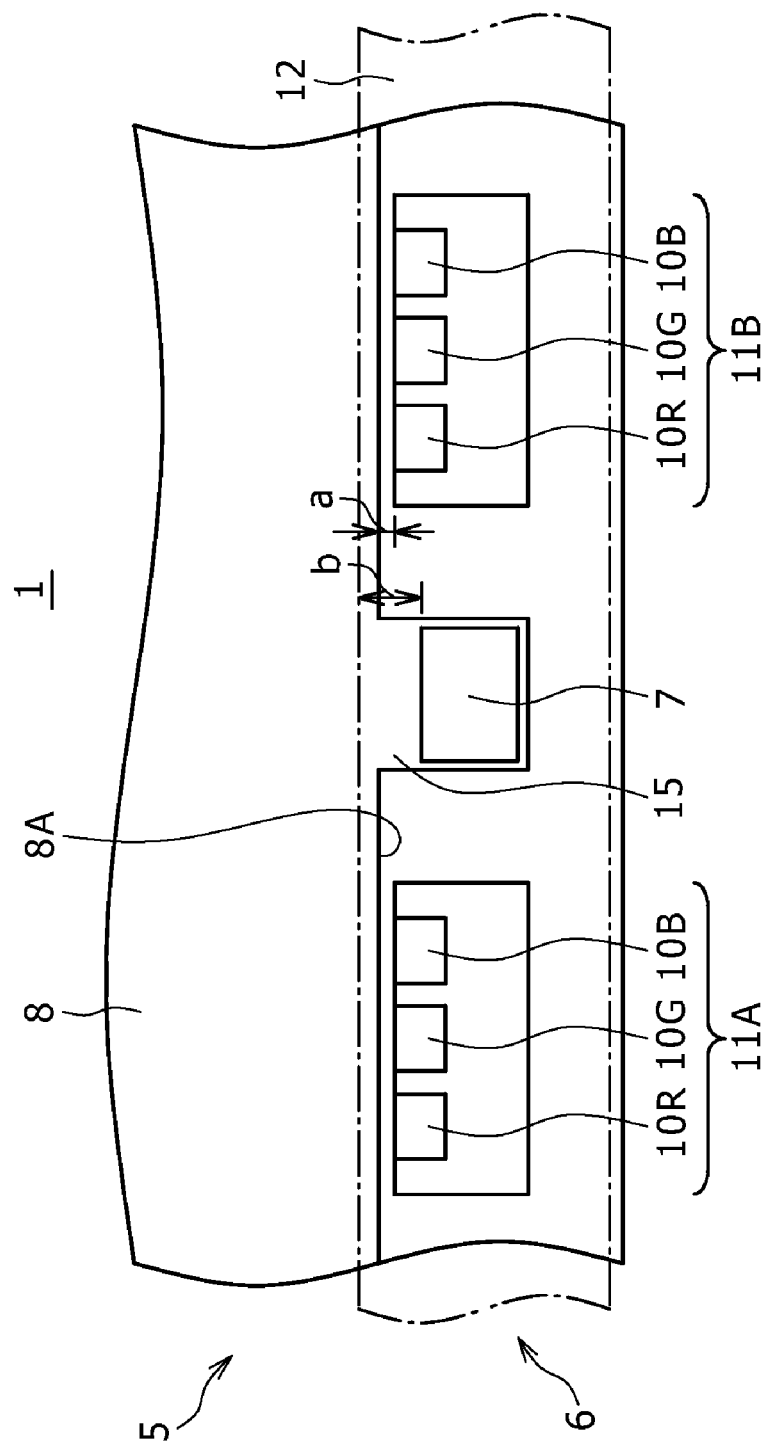
FIG. 3 is a front view showing a construction of a main portion of a light emitting portion, with parts being partially broken away.

The light detecting sensor 7, as shown in FIG. 3, is mounted on the flexible wiring board 12 by utilizing a space defined between the adjacent light emitting units 11A and 11B. An RGB color sensor manufactured by Agilent Technologies Co. Ltd., for example, is used as the light detecting sensor 7. The RGB color sensor conforms to a specification of a quard flat non-lead (QFN) type package having a small outside dimension of 5 (mm)×5 (mm)×1 (mm). While a description of details is omitted here, the RGB color sensor includes a photodiode array coated with red, green, and blue color filters, respectively, and three transimpedance amplifiers. Also, the overall RGB color sensor is integrated into a one-chip CMOSIC. The RGB color sensor is the so-called top view type light detecting sensor. Thus, a first principal surface side in a thickness direction is used as a light receiving portion 7A, and a second principal surface side in a thickness direction facing the light receiving portion 7A is used as a mounting surface 7B for the flexible wiring board 12. In the liquid crystal display device 1, the top view type thin light detecting sensor described above is used as the light detecting sensor 7. Also, the light detecting sensor 7 is mounted on the flexible wiring board 12 in a thickness posture of the light guiding plate 8 as shown in FIGS. 2 and 3. As a result, the thin make of the liquid crystal display device 1 is realized.

In the liquid crystal display device 1, as described above, the light detecting sensor 7 is mounted on the same flexible wiring board 12 having the light emitting unit 11 mounted thereon. Therefore, in the liquid crystal display device 1, the commonness of the wiring between the light detecting sensor 7 and the light emitting units 11 simplifies the wiring structure. As a result, the assembly and the maintenance are improved, and the miniaturization and the thin make are realized. Moreover, the cost is reduced due to reduction in the number of components or parts. In addition, in the liquid crystal display device 1, the miniature light detecting sensor 7 is mounted on the flexible wiring board 12 by utilizing the space defined between the light emitting units 11. Therefore, the miniaturization and the thin make are realized due to the improvement in the space efficiency.

In the liquid crystal display device 1, as described above, the light detecting sensor 7 is disposed on the same side as that of the light emitting units 11 with respect to the light guiding plate 8. In the liquid crystal display device 1, the color display lights which are emitted from the respective LEDs 10 and are made incident to the inside of the light guiding plate 8 are sufficiently mixed with one another to turn into the white display light. The resulting white display light is then supplied from the first principal surface 8C of the light guiding plate 8 to the display panel unit 3.

In the liquid crystal display device 1, the color display lights which are made incident from the light incidence surface 8A to the light guiding plate 8 are reflected by a surface facing the light incidence surface 8A to become the feedback light. Also, a part of the white display light obtained as the feedback light leaks through the light incidence surface 8A. In the liquid crystal display device 1, the light detecting sensor 7 which is disposed so as to face the light incidence surface 8A as described above detects the red component, the green component, and the blue component from the white display light. In the liquid crystal display device 1, the reciprocating of the color display lights within the light guiding plate 8 increases the propagation optical path. Thus, the light detecting sensor 7 receives the white display light which is obtained by sufficiently mixing the red component, the green component, and the blue component with one another. As a result, the color components can be detected with high precision.

The flexible wiring board 12, as shown in FIG. 2, is disposed in a lower portion of the light guiding plate 8 so as to be located on a front face side (on a display panel unit 3 side) of the display light guiding optical unit 5 as shown in FIG. 2. The light emitting units 11 and light detecting sensor 7 described above are mounted on a surface side facing the display light guiding optical unit 5 as shown in FIG. 2 on the flexible wiring board 12. As shown in FIGS. 2 and 3, the light emitting units 11 are mounted in positions along a side edge on the flexible wiring board 12 so that each of their light emission surfaces 11A is close to the light incidence surface 8A of the light guiding plate 8. Therefore, in the liquid crystal display device 1, the leakage of the color display lights emitted from the respective LEDs 10 to the periphery is suppressed and thus the color display lights are made incident to the inside of the light guiding plate 8.

As described above, the light detecting sensor 7 is mounted on the flexible wiring board 12 so as to be located between the adjacent light emitting units 11. In this case, as shown in FIG. 3, the light detecting sensor 7 is located inside the flexible wiring board 12 so that a distance "b" between a light receiving surface of the light detecting sensor 7 and the light incidence surface 8A of the light guiding plate 8 becomes larger than that "a" between the light incidence surface 8A and each of upper surfaces of the light emitting units 11. In the liquid crystal display device 1, the light detecting sensor 7 and the light emitting units 11 are mounted on the flexible wiring board 12 so as to have such a positional relationship. As a result, none of the color display lights emitted from the respective light emitting units 11 are directly detected by the light detecting sensor 7. Thus, the precision of detecting the white display light by the light detecting sensor 7 is enhanced.

Now, in the liquid crystal display device 1, as described above, the light detecting sensor 7 constituted by the top view type light detecting sensor is mounted on the flexible wiring board 12 so that the light receiving portion 7A intersects perpendicularly the light incidence surface 8A. This leads to that the light receiving portion 7A cannot directly receive the white display light which leaks through the light incidence surface 8A of the light guiding plate 8. For this reason, in the liquid crystal display device 1, a light guiding protrusion portion 15 which protrudes to the inside of the flexible wiring board 12 is formed integrally with the light guiding plate 8. Thus, the white display light is guided to the light receiving portion 7A of the light detecting sensor 7 through the light guiding protrusion portion 15.

As shown in FIGS. 2 and 3, the light guiding protrusion portion 15 is formed in the form of a tongue piece-shaped protrusion portion integrally with the light guiding plate 8. Here, the tongue piece-shaped protrusion portion faces the light receiving portion 7A of the light detecting sensor 7 so as to cover the portions from the light incidence surface 8A of the light guiding plate 8 to the light receiving portion 7A. As shown in FIG. 3, the light guiding protrusion portion 15 has an external form which faces the overall light receiving portion 7A of the light detecting sensor 7. Also, the light guiding protrusion portion 15 supplies the white display light to the light detecting sensor 7 with the first principal surface facing the light receiving portion 7A as the light emission surface 15A for the white display light. While details will be described later, a refraction structure is formed integrally with the light guiding protrusion portion 15. Here, the refraction structure serves to refract the white display light guided to the inside of the light guiding protrusion portion 15 to the light emission surface 15A.

Figure 4:
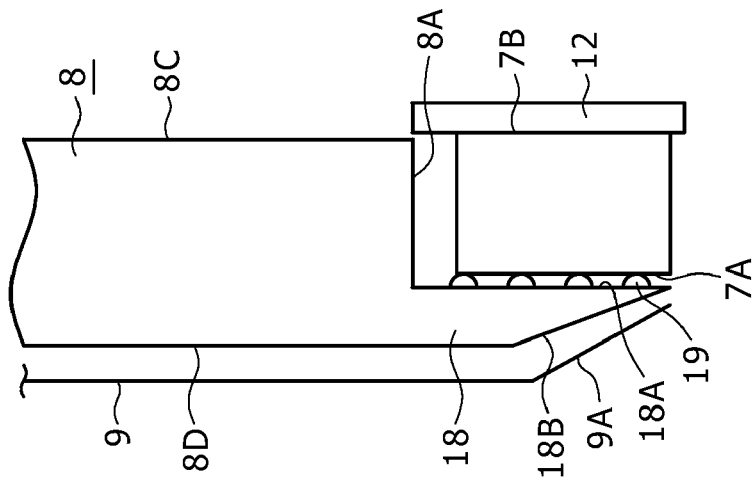
FIG. 4 is a view explaining a light guiding construction with which a white display light is supplied from an inside of a light guiding plate to a light detecting sensor.

In addition, in the liquid crystal display device 1, the light receiving portion 7A of the light detecting sensor 7 must receive efficiently the white display light through the light emission surface 15A of the light guiding protrusion portion 15. For this reason, as shown in FIG. 4, a part 9A of the reflecting sheet 9 provided along the second principal surface 8D of the light guiding plate 8 extends so as to face the second principal surface 15B facing the light emission surface 15A of the light guiding protrusion portion 15. Moreover, in the liquid crystal display device 1, as shown in FIG. 4, a portion 2A which faces a head portion of the light guiding protrusion portion 15 is formed in a part of the frame 2. In the liquid crystal display device 1, the reflecting sheet 9 and the frame 2 reduce the leakage of the white display light through the peripheral portion, and thus the white display light is efficiently supplied to the light detecting sensor 7.

For example, a large number of fine dot-shaped protrusion portions 16, as shown in FIG. 4, are formed as the above-mentioned refraction structure for refracting the white display light in the light guiding protrusion portion 15 by subjecting the light emission surface 15A to roughening processing. As a result, in the light guiding protrusion portion 15, the white display light which is guided to the inside of the light guiding plate 8 is propagated beyond the critical angle through these dot-shaped protrusion portions 16 as indicated by arrows in the figure to leak to the outside through the light emission surface 15A. The leakage white display light is then received by the light detecting sensor 7. Note that, although a large number of dot-shaped protrusion portions 16 are formed in the light emission surface 15A of the light guiding protrusion portion 15, the embodiment of the present invention is not intended to be limited thereto. That is to say, fine irregularities for causing irregular reflection may be formed. Alternatively, the refraction structure may be constructed by forming a large number of slits extending in the width direction, a right triangle-shaped recess trench, or the like.

Figure 5:
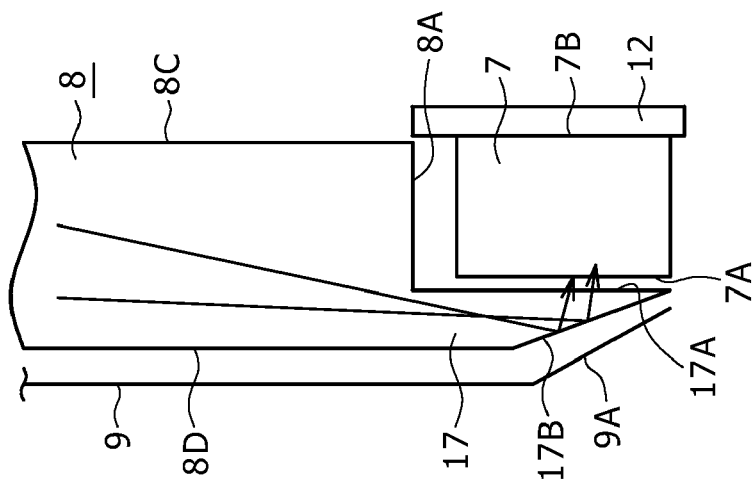
FIG. 5 is a view explaining another light guiding construction.

In addition, in the liquid crystal display device 1, for example, a light guiding protrusion portion 17 shown in FIG. 5 may be formed integrally with the light guiding plate 8 instead of the light guiding protrusion portion 15 having the dot-shaped protrusion portion 16 formed in its light emission surface 15A. In this case, the light guiding protrusion portion 17 is identical to the light guiding protrusion portion 15 in that the surface facing the light detecting sensor 7 is used as the light emission surface 17A. However, the feature of the light guiding protrusion portion 17 is that a total reflection inclined surface 17B is formed on the second principal surface side facing the light emission surface 17A.

That is to say, the total reflection inclined surface 17B having nearly a right triangle shape in cross section in which a thickness gradually decreases from a base portion toward a head portion is formed on the second principal surface side in the light guiding protrusion portion 17. In the light guiding protrusion portion 17, the white display light which is guided to the inside of the light guiding plate 8 is reflected from the total reflection inclined surface 17B as indicated by arrows in FIG. 5 to the light emission surface 17A side due to a so-called prism operation to leak to the outside through the light emission surface 17A. The leakage part of the white display light is then received by the light detecting sensor 7. Note that, in the liquid crystal display device 1, as shown in FIG. 5, a part 9A of the reflecting sheet 9 is bent so as to face the light emission surface 17A of the light guiding protrusion portion 17.

Figure 6:
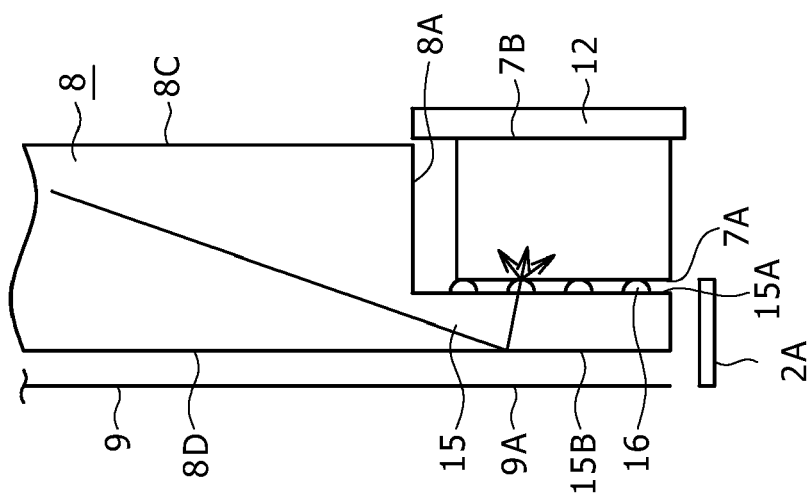
FIG. 6 is a view explaining still another light guiding construction.
Figure 12:
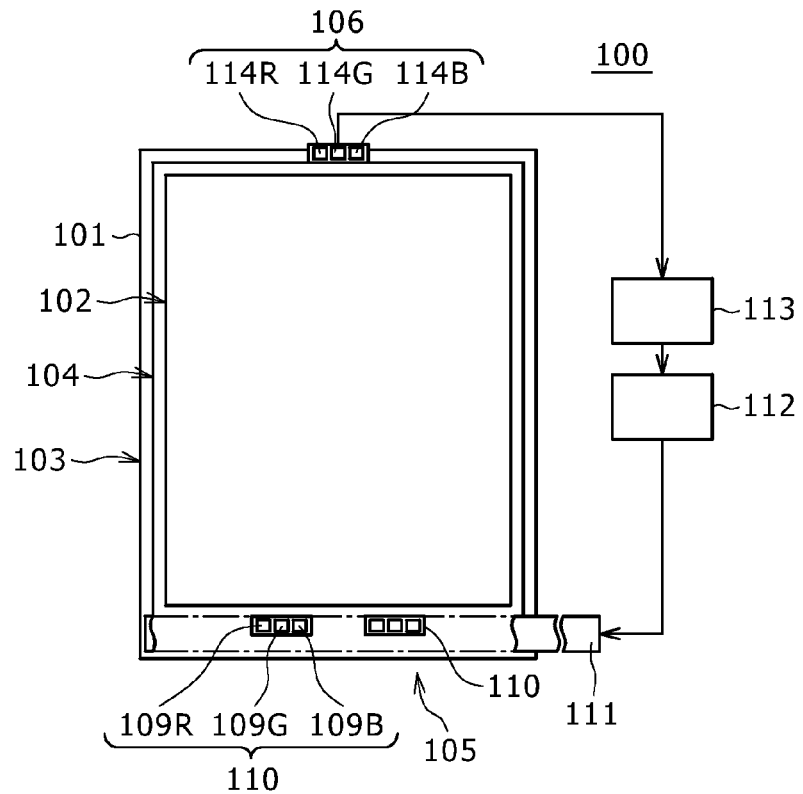
FIG. 12 is a front view of a main portion of a liquid crystal display device of a related art.
Figure 13:
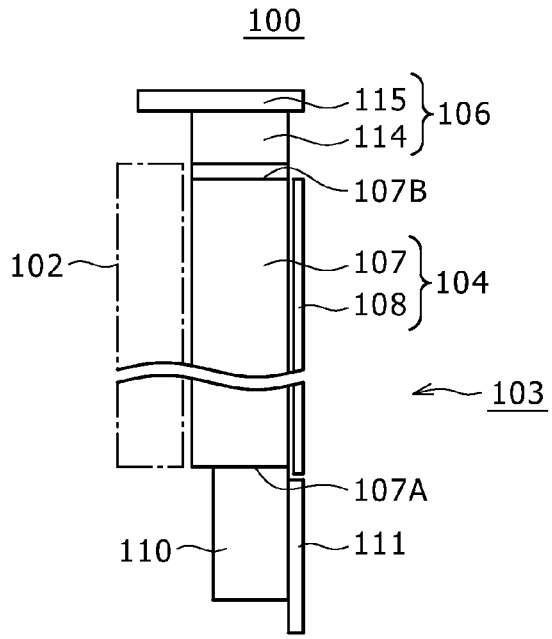
FIG. 13 is a cross sectional view of a main portion of the liquid crystal display device of the related art.

It should be noted that in the liquid crystal display device 1, for example, a light guiding protrusion portion 18 having both the construction of the light guiding protrusion portion 15 and the construction of the light guiding protrusion portion 17, as shown in FIG. 6, may be formed integrally with the light guiding plate 8. That is to say, in this case, in the light guiding protrusion portion 18, a large number of fine dot-shaped protrusion portions 19 are formed in a light emission surface 18A with the surface facing the light detecting sensor 7 as the light emission surface 18A. In addition, a total reflection inclined surface 18B having nearly a right triangle shape in cross section in which a thickness gradually decreases from a base portion toward a head portion is formed on the second principal surface side facing the light emission surface 17A in the light guiding protrusion portion 18. The light guiding protrusion portion 18 causes the white display light guided to the inside of the light guiding plate 8 to leak through the light emission surface 18A in accordance with the operation of the dot-shaped protrusion portions 19 formed in the light emission surface 18A and the total reflection inclined surface 18B on the second principal surface side.

Although in the first embodiment described above, the top view type light detecting sensor is used as the light detecting sensor 7, in the embodiment of the present invention, the so-called side view type light detecting sensor having a light receiving portion formed on its side face may also be used as the light detecting sensor 7. FIG. 7 shows a liquid crystal display device 20 according to a second embodiment of the present invention. The liquid crystal display device 20 is identical in basic construction to the liquid crystal display device 1 according to the first embodiment of the present invention, but has the feature in a construction of a side view type light detecting sensor 21 and a light guiding protrusion portion 22 formed in the light guiding plate 8. Here, the portions of the liquid crystal display device 20 corresponding to those of the liquid crystal display device 1 are designated with the same reference numerals, respectively, and a description thereof is omitted here for the sake of simplicity.

In the liquid crystal display device 20 as well, the light detecting sensor 21 is mounted together with the light emitting units 11 on the flexible wiring board 12 so as to face the light incidence surface 8A of the light guiding plate 8. Thus, the light detecting sensor 21 is disposed on the same side as that of the light emitting units 11 with respect to the light guiding plate 8. In the liquid crystal display device 20 as well, the commonness of the wiring between the light detecting sensor 21 and the light emitting units 11 simplifies the wiring structure. Thus, the assembly and the maintenance are improved, and the miniaturization and the thin make are realized. Moreover, the reduction in the number of components or parts results in the cost reduction is realized. In addition, in the liquid crystal display device 20 as well, the light detecting sensor 21 is mounted on the flexible wiring board 12 so as to be located in the space defined between the light emitting units 11. As a result, the miniaturization and the thin make are realized due to the improvement in the space efficiency.

In the liquid crystal display device 20 as well, the light emitting units 11 are mounted on the flexible wiring board 12 along a side edge so that each of their light emission surfaces 11A is made close to the light incidence surface 8A of the light guiding plate 8. Also, the leakage of the color display lights emitted from the respective LEDs 10 to the periphery is suppressed. Thus, the color display lights are made incident to the inside of the light guiding plate 8. In addition, in the liquid crystal display device 20, the light detecting sensor 21 is mounted on the flexible wiring board 21 so that its light receiving portion 21A faces the light incidence surface 8A of the light guiding plate 8. The light detecting sensor 21 is mounted on the flexible wiring board 21 so that its light receiving surface 21A is located inside the flexible wiring board 21. In this case, a distance between the light receiving surface 21A of the light detecting sensor 21 and the light incidence surface 8A of the light guiding plate 8 is made larger than that between the light incidence surface 8A and each of the upper surfaces of the light emitting units 11.

In the liquid crystal display device 20, a light guiding protrusion portion 22 is formed integrally with the light incidence surface 8A of the light guiding plate 8 so as to face the light receiving portion 21A of the light detecting sensor 21. Thus, the reciprocating of the color display lights within the light guiding plate 8 increases the propagation optical path. Therefore, the white display light which is obtained by sufficiently mixing the red component, the green component, and the blue component with one another is supplied to the light receiving portion 21A of the light detecting sensor 21 through an end face of the light guiding protrusion portion 22. In the liquid crystal display device 20, as described above, the light detecting sensor 21 is mounted on the flexible wiring board 12 so as to be located inside the flexible wiring board 12. Also, the liquid crystal display 20 receives the white display light at its light receiving portion 21A through the light guiding protrusion sensor 21. Therefore, in the liquid crystal display device 20, the light detecting sensor 21 is prevented from directly receiving the color display lights emitted from the respective light emitting units 11. As a result, the precision of detecting the white display light by the light detecting sensor 21 is improved, and also the white display light is efficiently supplied to the light detecting sensor 21.

In the liquid crystal display device, the white display light is efficiently supplied from the light guiding plate to the light detecting sensor. As a result, the light detecting sensor can detect the red component, the green component, and the blue component of the white display light with high precision. Simulation results for the light guiding protrusion portion 15, the dot-shaped protrusion portions 16, the total reflection inclined surface 17B, and the reflecting sheet 9 which serve to guide the white display light to the top view type light detecting sensor 7 disposed to face the light incidence surface 8A of the light guiding plate 8 will be described in detail hereinafter with reference to FIGS. 8A to 8D to FIGS. 10A to 10D.

The simulation results shown in FIGS. 8A to 8D show comparison made with respect to light guiding construction examples 25 to 28 in each of which the light detecting sensor 7 is disposed to face the light incidence surface 8A of the light guiding plate 8, and no portion facing the light detecting sensor 7 is formed in the reflecting sheet 9. In those simulation results, the light receiving efficiency of the light detecting sensor 7 in the light guiding construction example 25 shown in FIG. 8A in which the light detecting sensor 7 is disposed to face the light incidence surface 8A of the light guiding plate 8 is set as 100%. At this time, the light receiving efficiencies of the light detecting sensors 7 in the light guiding construction examples 26 to 28 with respect to the light receiving efficiency 100% of the light detecting sensor 7 in the light guiding construction example 25 are obtained as follows.

Light Guiding Construction Example 26 Shown in FIG. 8B

In the light guiding construction example 26, the light guiding protrusion portion 15 is formed in the light incidence surface 8A of the light guiding plate 8 so as to face the light receiving portion 7A of the light receiving sensor 7. Also, the dot-shaped protrusion portions 16 are formed in the light emission surface 15A of the light guiding protrusion portion 15. In this case, the light receiving sensor 7 in the light guiding construction example 26 shows the light receiving efficiency of 332%.

Light Guiding Construction Example 27 Shown in FIG. 8C

In the light guiding construction example 27, the light guiding protrusion portion 17 is formed in the light incidence surface 8A of the light guiding plate 8 so as to face the light receiving portion 7A of the light receiving sensor 7. Also, the total reflection inclined surface 17B is formed on the second principal surface side of the light guiding protrusion portion 17. In this case, the light receiving sensor 7 in the light guiding construction example 27 shows the light receiving efficiency of 725%.

Light Guiding Construction Example 28 Shown in FIG. 8D

In the light guiding construction example 28, the light guiding protrusion portion 15 is formed in the light incidence surface 8A of the light guiding plate 8 so as to face the light receiving portion 7A of the light receiving sensor 7. In addition, the dot-shaped protrusion portions 16 are formed in the light emission surface 15A of the light guiding protrusion portion 15. Also, the total reflection inclined surface 17B is formed on the second principal surface side of the light guiding protrusion portion 15. In this case, the light receiving sensor 7 of the light guiding construction example 28 shows the light receiving efficiency of 793%.

As apparent from the simulation results described above, in the liquid crystal display device 1, the light guiding protrusion portion 15 is formed in the light incidence surface 8A of the light guiding plate 8 so as to face the light receiving portion 7A of the light detecting sensor 7, which makes it possible to enhance the efficiency of receiving the white display light in the light detecting sensor 7. In the liquid crystal display device 1, the light guiding construction including the dot-shaped protrusion portions 16 and the total reflection inclined surface 17B is further formed in the principal surfaces of the two sides of the light guiding protrusion portion 15, which makes it possible to further enhance the efficiency of receiving the white display light.

Simulation results shown in FIGS. 9A to 9D are obtained by simulating the effects of the reflecting sheet 9 provided on the second principal surface 8D side of the light guiding plate 8 in addition to each of the light guiding constructions for which the first simulation described above is made. Each of light guiding construction examples 29 to 32 is constructed such that the light detecting sensor 7 is provided so as to face the light incidence surface 8A of the light guiding plate 8, and the part 9A of the reflecting sheet 9 extends so as to face the light receiving surface 7A of the light detecting sensor 7. In this simulation as well, there are obtained the light receiving efficiencies in the light guiding construction examples 29 to 32 when the light receiving efficiency of the light detecting sensor 7 in the light guiding construction example 25 having the basic construction described above is set as 100%. The simulation results are obtained as follows.

Light Guiding Construction Example 29 Shown in FIG. 9A

In the light guiding construction example 29, the facing portion 9A is formed in the reflecting sheet 9 facing the light receiving portion 7A of the light detecting sensor 7 provided to face the light incidence surface 8A of the light guiding plate 8 so as to face the light receiving portion 7A of the light detecting sensor 7. In this case, the light detecting sensor 7 in the light guiding construction example 29 shows the light receiving efficiency of 965%.

Light Guiding Construction Example 30 Shown in FIG. 9B

In the light guiding construction example 30, the light guiding protrusion portion 15 is formed in the light incidence surface 8A of the light guiding plate 8 so as to face the light receiving portion 7A of the light detecting sensor 7. In addition, the dot-shaped protrusion portions 16 are formed in the light emission surface 15A of the light guiding protrusion portion 15. Also, the facing portion 9A is formed in the reflecting sheet 9 so as to face the light receiving surface 7A of the light detecting sensor 7. In this case, the light detecting sensor 7 in the light guiding construction example 30 shows the light receiving efficiency of 765%.

Light Guiding Construction Example 31 Shown in FIG. 9C

In the light guiding construction example 31, the light guiding protrusion portion 17 is formed in the light incidence surface 8A of the light guiding plate 8 so as to face the light receiving portion 7A of the light detecting sensor 7. In addition, the total reflection inclined surface 17B is formed on the second principal side of the light guiding protrusion portion 17. Also, the facing portion 9A is formed in the reflecting sheet 9 so as to face the light receiving surface 7A of the light detecting sensor 7. In this case, the light detecting sensor 7 in the light guiding construction example 31 shows the light receiving efficiency of 1,122%.

Light Guiding Construction Example 32 Shown in FIG. 9D

In the light guiding construction example 32, the light guiding protrusion portion 15 is formed in the light incidence surface 8A of the light guiding plate 8 so as to face the light receiving portion 7A of the light detecting sensor 7. In addition, the dot-shaped protrusion portions 16 are formed in the light emission surface 15A of the light guiding protrusion portion 15. Also, the total reflection inclined surface 17B is formed on the second principal surface side, and the facing portion 9A is formed in the reflecting sheet 9 so as to face the light receiving surface 7A of the light detecting sensor 7. In this case, the light detecting sensor 7 in the light guiding construction example 32 shows the light receiving efficiency of 1,304%.

As apparent from the simulation results described above, in the liquid crystal display device 1, the light guiding protrusion portion 15 is formed in the light incidence surface 8A of the light guiding plate 8 so as to face the light receiving portion 7A of the light detecting sensor 7. Also, the part 9A of the reflecting sheet 9 extends so as to face the light receiving portion 7A of the light detecting sensor 7. As a result, it is possible to further enhance the efficiency of receiving the white display light in the light detecting sensor 7. In the liquid crystal display device 1, the dot-shaped protrusion portions 16 and the total reflection inclined surface 17B are further formed in the principal surfaces of the two sides of the light guiding protrusion portion 15. Here, the dot-shaped protrusion portions 16 and the total reflection inclined surface 17B constitute the light guiding construction. As a result, it is possible to further enhance the efficiency of receiving the white display light.

Simulation results shown in FIGS. 10A to 10D are obtained by simulating the effects of the light shielding portion 2A provided by the frame 2 provided to face the light incidence surface 8A of the light guiding plate 8 in addition to each of the light guiding constructions for which the second simulation described above is made. In each of light guiding construction examples 33 to 36, the light detecting sensor 7 disposed so as to face the light incidence surface 8A of the light guiding plate 8, and the reflecting sheet 9 having the part 9A extending so as to face the light receiving surface 7A of the light detecting sensor 7 are provided as the basic construction. Also, the light guiding protrusion portion 15 is formed in the light guiding plate 8 so as to face the light detecting sensor 7, and the light shielding portion 2A provided by the frame 2 is formed. In this simulation as well, there are obtained the light receiving efficiencies in the light guiding construction examples 33 to 36 when the light receiving efficiency of the light detecting sensor 7 in the light guiding construction example 25 having the basic construction described above is set as 100%. The simulation results are obtained as follows.

Light Guiding Construction Example 33 Shown in
FIG. 10A

In the light guiding construction example 33, the facing portion 9A is formed in the reflecting sheet 9 facing the light receiving portion 7A of the light detecting sensor 7 provided to face the light incidence surface 8A of the light guiding plate 8 so as to face the light receiving portion 7A of the light detecting sensor 7. Also, the light shielding portion 2A provided by the frame 2 is provided so as to face the light incidence surface 8A of the light guiding plate 8. In this case, the light detecting sensor 7 in the light guiding construction example 33 shows the light receiving efficiency of 1,414%.

Light Guiding Construction Example 34 Shown in
FIG. 10B

In the light guiding construction example 34, the light guiding protrusion portion 15 is formed in the light incidence surface 8A of the light guiding plate 8 so as to face the light receiving portion 7A of the light detecting sensor 7. In addition, the dot-shaped protrusion portions 16 are formed in the light emission surface 15A of the light guiding protrusion portion 15, and the facing portion 9A is formed in the reflecting sheet 9 so as to face the light receiving surface 7A of the light detecting sensor 7. Also, the light shielding portion 2A provided by the frame 2 is formed so as to face the light incidence surface 8A of the light guiding plate 8. In this case, the light detecting sensor 7 in the light guiding construction example 34 shows the light receiving efficiency of 1,057%.

Light Guiding Construction Example 35 Shown in
FIG. 10C

In the light guiding construction example 35, the light guiding protrusion portion 17 is formed in the light incidence surface 8A of the light guiding plate 8 so as to face the light receiving portion 7A of the light detecting sensor 7. In addition, the total reflection inclined surface 17B is formed on the second principal surface side of the light guiding protrusion portion 17 and the facing portion 9A is formed in the reflecting sheet 9 so as to face the light receiving surface 7A of the light detecting sensor 7. Also, the light shielding portion 2A provided by the frame 2 is formed so as to face the light incidence surface 8A of the light guiding plate 8. In this case, the light detecting sensor 7 in the light guiding construction example 35 shows the light receiving efficiency of 1,566%.

Light Guiding Construction Example 36 Shown in
FIG. 10D

In the light guiding construction example 36, the light guiding protrusion portion 15 is formed in the light incidence surface 8A of the light guiding plate 8 so as to face the light receiving portion 7A of the light detecting sensor 7. In addition, the dot-shaped protrusion portions 16 are formed in the light emission surface 15A of the light guiding protrusion portion 15. Also, the total reflection inclined surface 17B is formed on the second principal surface side, and the facing portion 9A is formed in the reflecting sheet 9 so as to face the light receiving surface 7A of the light detecting sensor 7. Also, the light shielding portion 2A provided by the frame 2 is formed so as to face the light incidence surface 8A of the light guiding plate 8. In this case, the light detecting sensor 7 in the light guiding construction example 36 shows the light receiving efficiency of 1,763%.

As apparent from the simulation results described above, in the liquid crystal display device 1, the light guiding protrusion portion 15 is formed in the light incidence surface 8A of the light guiding plate 8 so as to face the light receiving portion 7A of the light detecting sensor 7. In addition, the part 9A of the reflecting sheet 9 extends so as to face the light receiving portion 7A of the light detecting sensor 7. Also, the light shielding portion 2A provided by the frame 2 is formed so as to face the light incidence surface 8A of the light guiding plate 8. As a result, the construction is obtained such that the light receiving portion 7A of the light detecting sensor 7 is surrounded by the part 9A of the reflecting sheet 9, and the light shielding portion 2A of the frame 2. In the liquid crystal display device 1, the adoption of such a light guiding construction makes it possible to further enhance the efficiency of receiving the white display light in the light detecting sensor 7. In the liquid crystal display device 1, the dot-shaped protrusion portions 16 and the total reflection inclined surface 17B are further formed in the principal surfaces of the two sides of the light guiding protrusion portion 15. Here, the dot-shaped protrusion portions 16 and the total reflection inclined surface 17B constitute the light guiding construction. As a result, it is possible to further enhance the efficiency of receiving the white display light.

Simulation results shown in FIGS. 11A and 11B are obtained by simulating the effects of the construction such that the extension part 9A of the reflecting sheet 9 is bent along the light guiding protrusion portion 15 in each of the light guiding constructions for which the third simulation described above is made. In each of light guiding construction examples 37 and 38, the light detecting sensor 7 and the reflecting sheet 9 are provided as the basic construction. The light detecting sensor 7 is disposed so as to face the light incidence surface 8A of the light guiding plate 8. The part 9A extending from the reflecting sheet 9 is bent so as to face the light receiving surface 7A of the light detecting sensor 7. Also, the light guiding protrusion portion 15 is formed in the light guiding plate 8 so as to face the light detecting sensor 7. In this simulation as well, there are obtained the light receiving efficiencies in the light guiding construction examples 37 and 38 when the light receiving efficiency of the light detecting sensor 7 in the light guiding construction example 25 having the basic construction described above is set as 100%. The simulation results are obtained as follows.

Light Guiding Construction Example 37 Shown in
FIG. 11A

In the light guiding construction example 37, the light guiding protrusion portion 17 is formed in the light incidence surface 8A of the light guiding plate 8 so as to face the light receiving portion 7A of the light detecting sensor 7. In addition, the total reflection inclined surface 17B is formed on the second principal surface side of the light guiding protrusion portion 17, and the facing portion 9A is formed in the reflecting sheet 9 so as to face the light receiving portion 7A of the light detecting sensor 7. Also, the facing portion 9A is bent along the total reflection inclined surface 17B. In this case, the light detecting sensor 7 in the light guiding construction example 37 shows the light receiving efficiency of 1,932%.

Light Guiding Construction Example 38 Shown in
FIG. 11B

In the light guiding construction example 38, the light guiding protrusion portion 15 is formed in the light incidence surface 8A of the light guiding plate 8 so as to face the light receiving portion 7A of the light detecting sensor 7. In addition, the dot-shaped protrusion portions 16 are formed in the light emission surface 15A of the light guiding protrusion portion 15, and the total reflection inclined surface 17B is formed on the second principal surface of the light guiding protrusion portion 17. Also, the facing portion 9A is formed in the reflecting sheet 9 so as to face the light receiving surface 7A of the light detecting sensor 7, and the facing portion 9A is bent along the total reflection inclined surface 17B. In this case, the light detecting sensor 7 in the light guiding construction example 38 shows the light receiving efficiency of 1,782%.

As apparent from the simulation results described above, in the liquid crystal display device 1, the light guiding protrusion portion 17 having the total reflection inclined surface 17B is formed in the light incidence surface 8A of the light guiding plate 8 so as to face the light receiving portion 7A of the light detecting sensor 7. In addition, the part 9A extending from the reflecting sheet 9 is bent along the total reflection inclined surface 17B so as to face the light receiving portion 7A. As a result, it is possible to further enhance the efficiency of receiving the white display light in the light detecting sensor 7. In the liquid crystal display device 1, even when the dot-shaped protrusion portions 16 are formed in the light emission surface 15A of the light guiding protrusion portion 15, it is possible to further enhance the efficiency of receiving the white display light in the light detecting sensor 7.

Note that, although the liquid crystal display device to which the embodiment of the present invention is applied has been described as the embodiment so far, the embodiment of the present invention is not intended to be limited to such a liquid crystal display device. That is to say, the embodiment also be applied to various types of optical display devices in each of which display lights emitted from a light emitting portion having a red illuminant, a green illuminant, and a blue illuminant are guided to a display portion through a light guiding plate provided on a back face side of the display portion in order to perform color display. In addition, in the liquid crystal display device 1, the LEDs 10 and the light detecting sensor 7 are mounted on the flexible wiring board 12. However, it is to be understood that any of general circuit boards may be used. When the extension portion 9A is formed in the reflecting sheet 9, the flexible wiring board 12 is disposed on the first principal surface 8C side of the light guiding plate 8. However, when there is no extension portion 9A, the flexible wiring board 12 may be disposed in one of the principal surfaces of the both sides of the light guiding plate 8.

In addition, in each of the first and second embodiments described above, the part 9A of the reflecting sheet 9 is formed so as to face the second principal surface 15B side of the light guiding protrusion portion 15. For example, however, a reflecting film is formed in the second principal surface 15B of the light guiding protrusion portion 15, thereby making it possible to replace the function of the part 9A with the reflecting film thus formed.

Moreover, in each of the first and second embodiments described above, each of the light emitting units 11 has the red LED 10R, the green LED 10G, and the blue LED 10B. Also, the color components of the white display light which is obtained by mixing the red display light, the green display light, and the blue display light emitted from the red LED 10R, the green LED 10G, and the blue LED 10B, respectively, with one another are detected. However, the color components of the display lights emitted from two or more illuminants having different peak wavelengths may also be detected. In this case, the color light mixing is previously performed for the display lights.

It should be understood by those skilled in the art that various modifications, combinations, sub-combinations and alterations may occur depending on design requirements and other factors insofar as they are within the scope of the appended claims or the equivalents thereof.

What is claimed is:

1. An optical display device, comprising:
   at least two illuminants have different peak wavelengths;
   a light guiding plate including (1) a display portion and (2) a peripheral portion with an incidence surface facing said illuminants, said light guiding plate receiving light from the illuminants through the incidence surface and mixing said light with one another to result in white light, said light guiding plate further directing the white light to said display portion; and
   a light detecting sensor which detects the white display light thereby enabling control of emission of said light from said illuminants,
   wherein,
   said light detecting sensor and said at least two or more illuminants are commonly mounted on a wiring board with said illuminants being disposed so light emitting surfaces thereof to face said light incidence surface of said light guiding plate,
   said light detecting sensor is disposed on the same side of said wiring board as said illuminants with respect to said light guiding plate so as to receive white light from the light guiding plate,
   said light detecting sensor is mounted on said wiring board so that a light receiving portion thereof is located in an inside with respect to said light emitting surfaces of said two or more illuminants, and
   said light guiding plate includes a light guiding protrusion portion which protrudes from said peripheral portion to an inside of said wiring board.

2. The optical display device according to claim 1, wherein said light detecting sensor is a side view type light detecting sensor having a light receiving portion positioned on a face intersecting perpendicularly with respect to a mounting surface of said wiring board, and said light receiving portion receives the white display light which leaks through an end face of said light guiding protrusion portion.

3. The optical display device according to claim 2, further comprising a reflecting wall facing said light guiding protrusion portion of said light guiding plate.

4. The optical display device according to claim 1, wherein said light detecting sensor is a top view type light detecting sensor having a light receiving portion provided on a surface facing a mounting surface of said wiring board, and said light receiving portion receives the white display light which leaks through a first principal surface, facing said light receiving portion, of said light guiding protrusion portion.

5. The optical display device according to claim 4, wherein said light guiding protrusion portion has a second principal surface which inclined relative to said first principle surface and is a total reflection inclined surface such that it reflects the white display light to the said first principal surface.

6. The optical display device according to claim 5, wherein said first principle surface includes a roughened surface.

7. The optical display device according to claim 6, further comprising a reflecting sheet facing said second principal surface.

8. The optical display device according to claim 7, wherein said reflecting sheet piece is constructed in a form of a reflecting protrusion piece portion which is formed integrally with a portion of a reflecting sheet facing said light incidence portion of said light guiding plate so as to face said light guiding protrusion portion, said reflecting sheet being provided on the second principal surface side facing said first principal surface of said light guiding plate facing said display portion.

9. The optical display device according to claim 8, further comprising a reflecting wall facing said light guiding protrusion portion.

* * * * *